(12) United States Patent
Ben-Yehuda et al.

(10) Patent No.: US 11,467,730 B1
(45) Date of Patent: Oct. 11, 2022

(54) METHOD AND SYSTEM FOR MANAGING DATA STORAGE ON NON-VOLATILE MEMORY MEDIA

(71) Applicant: Lightbits Labs Ltd., Kfar Saba (IL)

(72) Inventors: Shmuel Ben-Yehuda, Haifa (IL); Ofir Efrati, Even Yehuda (IL); Abel Alkon Gordon, Haifa (IL); Ofer Hayut, Rosh Pina (IL); Eran Kirzner, Moshav Elishama (IL); Alexander Shpiner, Nesher (IL); Roy Shterman, Kfar Saba (IL); Maor Vanmak, Magal (IL)

(73) Assignee: LIGHTBITS LABS LTD., Kfar Saba (IL)

( * ) Notice: Subject to any disclaimer, the term of this patent is extended or adjusted under 35 U.S.C. 154(b) by 1 day.

(21) Appl. No.: 17/139,027

(22) Filed: Dec. 31, 2020

(51) Int. Cl.
*G06F 3/06* (2006.01)
*G06F 12/0802* (2016.01)

(52) U.S. Cl.
CPC .......... *G06F 3/0604* (2013.01); *G06F 3/0647* (2013.01); *G06F 3/0679* (2013.01); *G06F 12/0802* (2013.01); *G06F 2212/60* (2013.01)

(58) Field of Classification Search
CPC ...... G06F 3/0659; G06F 3/0679; G06F 3/061; G06F 3/0604; G06F 3/064; G06F 3/0688; G06F 3/0652; G06F 3/0685; G06F 3/0647; G06F 12/0246; G06F 12/0868; G06F 12/0866; G06F 12/0253; G06F 2212/7205; G06F 2212/7211; G06F 2212/1036; G06F 2212/7204
See application file for complete search history.

(56) References Cited

U.S. PATENT DOCUMENTS

| | | | |
|---|---|---|---|
| 9,921,963 B1* | 3/2018 | Li | G06F 12/0833 |
| 2018/0253384 A1* | 9/2018 | Li | G06F 12/0804 |
| 2019/0026233 A1* | 1/2019 | Schlansker | G06F 15/173 |
| 2019/0294345 A1* | 9/2019 | Yu | G06F 12/0638 |
| 2019/0391756 A1* | 12/2019 | Wang | G06F 3/0659 |

OTHER PUBLICATIONS

Eunji Lee et al., "Reducing Write Amplification of Flash Storage through Cooperative Data Management with NVM", Apr. 2017, IEEE, 2016 32nd Symposium on Mass Storage Systems and Technologies (MSST), pp. 1-6 (Year: 2017).*

* cited by examiner

*Primary Examiner* — Reginald G Bragdon
*Assistant Examiner* — Curtis James Kortman
(74) *Attorney, Agent, or Firm* — Pearl Cohen Zedek Latzer Baratz LLP

(57) ABSTRACT

Systems and methods of managing data storage, on non-volatile memory (NVM) media, by at least one processor may include: receiving a first storage request, to store a first data block on the NVM media; storing content of the first data block on a cache memory module; scheduling a future movement action of the content of the first data block from the cache memory module to the NVM media; and moving, transmitting or copying the content of the first data block from the cache memory module to at least one NVM device of the NVM media, according to the scheduled movement action.

17 Claims, 6 Drawing Sheets

METHOD AND SYSTEM FOR MANAGING DATA STORAGE ON NON-VOLATILE MEMORY MEDIA

CROSS-REFERENCE TO RELATED APPLICATIONS

This application claims the benefit of provisional U.S. Patent Application No. 63/050,815, filed Jul. 12, 2020 and entitled: "SYSTEM AND METHOD OF IMPROVING FLASH ENDURANCE THROUGH WRITE CONSERVATION AND ELIMINATION", which is hereby incorporated by reference in its entirety.

FIELD OF THE INVENTION

The present invention relates generally to storage devices. More specifically, the present invention relates to managing data storage on non-volatile memory media.

BACKGROUND OF THE INVENTION

Non-volatile memory (NVM) storage media has become ubiquitous in a variety of computerized applications. For example, distributed storage servers may be communicatively connected to a plurality of client computing devices, and may employ or control NVM storage media to facilitate storage requirements pertaining to applications that are hosted by the client computing devices. The term storage media may be used in this context to refer to storage that is implemented by, or includes one or more NVM storage devices, such as flash memory devices and solid-state drives (SSDs).

The inherent speed of data fetching from NVM media or NVM devices, as well as the lack of moving mechanical parts and relatively small aspect ratio have made these devices a preferable selection to hard-disk storage systems, in applications ranging from Internet-of-Things (IoT) devices to cloud-based servers.

As known in the art, the internal storage of NVM devices is normally divided into blocks, also known as "erase blocks". These blocks are further divided into equally-sized pages, so that each block is a collection of pages. Blocks are defined as the smallest units that can be erased, whereas pages are defined as the smallest units that can be written.

In order to reuse (e.g., rewrite) a page, all the pages belonging to the same block must be erased. Thus, NVM devices always write new data into free pages, that have been previously erased, even if a previous version of the data has been written in a different page. When this happens, the page holding the old data becomes invalid, but cannot be re-used until the block holding it is erased in its entirety. The number of times a block can be erased is limited and affects the endurance of the NVM device.

NVM devices have an internal garbage-collection (GC) mechanism, responsible for reclaiming invalid pages. The internal GC mechanism scans for candidate blocks to be reclaimed (e.g., blocks that have more invalid pages than valid pages). The valid pages of candidate blocks are read and copied to a new block. Finally, the GC mechanism erases the whole block and marks it as free, so it could be re-used for future writes.

Write operations can be divided into two classes: writes generated by the internal GC mechanism and writes generated by an external client computer, hosting an application that requires access to the NVM storage device. The total number of write operations a device can handle or endure is limited. Therefore, it is desirable to minimize the number of write operations generated by the internal GC process so that the NVM storage device will be able to handle more external write operations. Moreover, reducing the number of GC writes directly reduces the number of required erasure cycles (also known as program-erase (PE) cycles), and may improve the lifetime and endurance of the NVM device.

The write amplification (WA) parameter is a metric used to measure the relation between external write operations and GC write operations, and may be defined in the following example equation, Eq. 1:

$$WA = (\text{External-Writes} + \text{GC-Writes}) / (\text{External-Writes}) \quad \text{Eq. 1}$$

As shown in Eq. 1, it is desired to keep the WA as low as possible. For example: it is desired to keep WA as close as possible to the minimal value of 1, where there are no GC write operations.

SUMMARY OF THE INVENTION

When a client computing device (e.g., a computer which hosts an application) accesses an NVM storage device (e.g., to read or write data), it may specify a desired location for the data using a virtual address in an application address space or user address space. This virtual address is translated via one or more translation layers, until it reaches the underlying NVM storage device.

For example, a client computing device may transmit a data access request (e.g., a data write request, to store a data object) to a storage server. The data access request may include a user address in a user address space. The user address may include a base address (e.g., an address of a namespace, which can be thought of as a virtual hard drive), and an offset address, which may be an offset of a storage block within the user address space. The storage server may implement a first address translation layer that may translate between the user address and a logical block address (LBA), in a logical address space. The storage server may transmit the data access request, using the LBA address to a controller of the NVM storage device.

The controller of the NVM storage device may then store the data object in any physical address within the NVM and may also move the data location as a result of GC activity. The NVM device controller may implement a second translation layer to maintain the association of each data object's LBA address with the physical address or location on the NVM storage device. The term physical block address (PBA) may be used herein to refer to the physical address or location of the stored data object 210A on the NVM storage device.

Currently available systems for management of data storage on NVM devices do not process or handle data rewrites or overwrites to the same LBA well. By writing the same logical block into different physical block addresses, currently available storage systems increase the write amplification of the NVM storage device, and diminish the endurance performance of the NVM device.

Some available storage systems may address this problem by placing a small persistent caching layer between a user (e.g., a client computing device) and the underlying NVM storage device. This caching layer may keep the content of written data objects for a certain amount of time before writing them to the underlying NVM storge device. When performing multiple write operations to the same logical block, the write requests may be held at the caching layer, and only the last version of the data object pertaining to a specific LBA will be written to the underlying NVM storage device.

The drawback of such a solution is that it is insensitive to the differences between applications. Each application may have a different size of data sets and may employ different write patterns. Therefore, the optimal time to retain data in the caching layer is application dependent, and pertains to the behavior of that application. Thus, currently available systems that employ such caching layers may not serve the purpose of improving write amplification, endurance and performance for all types of applications.

Embodiments of the invention may provide a practical application for computer storage systems. Embodiments of the invention may include an improvement over currently available computer storage systems by employing an intelligent caching policy, that may prevent rewriting the same logical blocks into different physical addresses, as elaborated herein.

Embodiments of the invention may include an improvement of storage technology by maintaining written data objects 210A within a persistent cache memory module for an optimized amount of time. This amount of time may be optimized according to data access patterns and/or size of data sets of one or more applications.

Additionally, embodiments of the invention may include an improvement of storage technology by enabling efficient operation of the internal garbage collection mechanism inside NVM storage devices. Thus, embodiments of the invention may reduce the amount of valid data that is moved by the internal garbage collection mechanism.

The significance of these improvements is especially relevant in storage systems that employ high capacity, low endurance storage devices such as quad-level cell (QLC) SSDs, where the level of write amplification is of particular significance.

Embodiments of the invention may include a method of managing data storage, on non-volatile memory (NVM) media, by at least one processor. Embodiments of the method may include: receiving a first storage request, to store a first data block on the NVM media; storing content of the first data block on a cache memory module; scheduling a future movement action of the content of the first data block from the cache memory module to the NVM media; and moving, copying or transmitting the content of the first data block from the cache memory module to at least one NVM device of the NVM media, according to the scheduled movement action.

According to some embodiments, the first storage request may include a first logical block address associated with the first data block. Scheduling the movement action may include: comparing the first logical block address with one or more second logical block addresses, associated with one or more respective, previously received second data blocks; and preventing movement of the one or more second data blocks to the NVM media based on the comparison.

Embodiments of the invention may attribute a timestamp to the first data block, said timestamp corresponding to the time of reception of the first storage request. Embodiments may schedule the movement action by: calculating a timeout value based on the first timestamp; and scheduling a time for the future movement action based on the calculated timeout value.

Additionally, embodiments of the invention may invalidate, on the cache memory module, storage of at least one data block based on the calculated timeout value.

According to some embodiments of the invention, scheduling the movement action may include: querying a value of a write amplification parameter from a controller of the at least one NVM device; comparing the value of the write amplification parameter to a predefined threshold; and scheduling a time for the movement action based on the comparison of the write amplification parameter and the predefined threshold.

According to some embodiments, the first storage request may include a logical block address associated with the first data block. Embodiments of the invention may prevent an NVM controller of the at least one NVM device from performing garbage collection of data blocks that are: (a) stored on the at least one NVM device; and (b) are associated with the same logical block address.

Embodiments of the invention may receive a plurality of storage requests, each associated with respective storage request metadata; analyze the storage request metadata to obtain a working set size of at least one namespace; and may provision, or allocate, on the cache memory module, a memory space that is dedicated for the at least one namespace, based on the obtained working set size.

According to some embodiments, the storage request metadata may be selected from a list consisting of: a namespace corresponding to the respective storage request, a timestamp corresponding to the reception of the respective storage request, and a size of storage corresponding to the respective storage request.

Embodiments of the invention may analyze the storage request metadata to obtain a rate of access of the working set. Embodiments of the invention may subsequently provision or allocate a memory space on the cache memory module based on the rate of access of the working set.

According to some embodiments, storing of content of the first data block on the cache memory module may be done according to, or within the dedicated memory space of the at least one namespace. Additionally, or alternatively, embodiments of the invention may store the content of the first data block on the cache memory module according to, or within the dedicated memory space of the at least one working set.

Embodiments of the invention may include a system for managing data storage, on NVM media. Embodiments of the system may include: a non-transitory memory device, wherein modules of instruction code may be stored, and at least one processor associated with the memory device, and configured to execute the modules of instruction code. Upon execution of said modules of instruction code, the at least one processor may be configured to: receive a first storage request, to store a first data block on the NVM media store content of the first data block on a cache memory module; schedule a future movement action of the content of the first data block from the cache memory module to the NVM media; and move the content of the first data block from the cache memory module to at least one NVM device of the NVM media, according to the scheduled movement action.

Embodiments of the invention may include a method of managing data storage on NVM media by at least one processor. Embodiments of the method may include: receiving a storage request, to store a first data block having a specific logical block address on the NVM media; storing content of the first data block on a memory buffer; associating a first timestamp to the first data block, corresponding to the time of reception of the first data block; performing a first comparison between the logical block address of the first data block and a logical block address of a second data block, previously stored on the memory buffer; performing a first comparison between the first timestamp and a second timestamp of the second data block; and storing content of the first data block on the NVM media based on the first comparison and second comparison.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
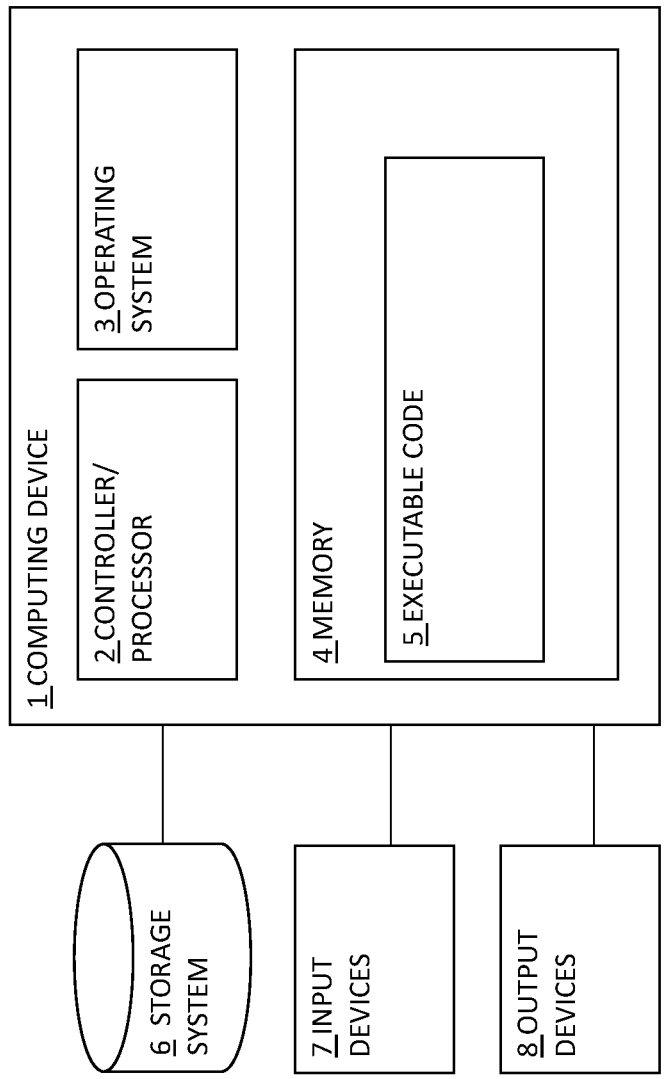
FIG. 1 is a block diagram, depicting a computing device which may be included in a system for managing data storage on NVM storage media according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items.

Unless explicitly stated, the method embodiments described herein are not constrained to a particular order or sequence. Additionally, some of the described method embodiments or elements thereof can occur or be performed simultaneously, at the same point in time, or concurrently.

Reference is now made to FIG. 1, which is a block diagram depicting a computing device, which may be included within an embodiment of a system for managing data storage on NVM storage media, according to some embodiments.

Computing device 1 may include a processor or controller 2 that may be, for example, a central processing unit (CPU) processor, a chip or any suitable computing or computational device, an operating system 3, a memory 4, executable code 5, a storage system 6, input devices 7 and output devices 8. Processor 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task or script. Executable code 5 may be executed by processor or controller 2 possibly under control of operating system 3. For example, executable code 5 may be an application that may manage data storage on NVM storage media as described herein. Although, for the sake of clarity, a single item of executable code 5 is shown in FIG. 1, a system according to some embodiments of the invention may include a plurality of executable code segments similar to executable code 5 that may be loaded into memory 4 and cause processor 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data and/or metadata pertaining to management of storage on NVM storage media may be stored in storage system 6 and may be loaded from storage system 6 into memory 4 where it may be processed by processor or controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., similar to element 2), a plurality of input units, a plurality of output units, a plurality of memory units, and a plurality of storage units.

Figure 2:
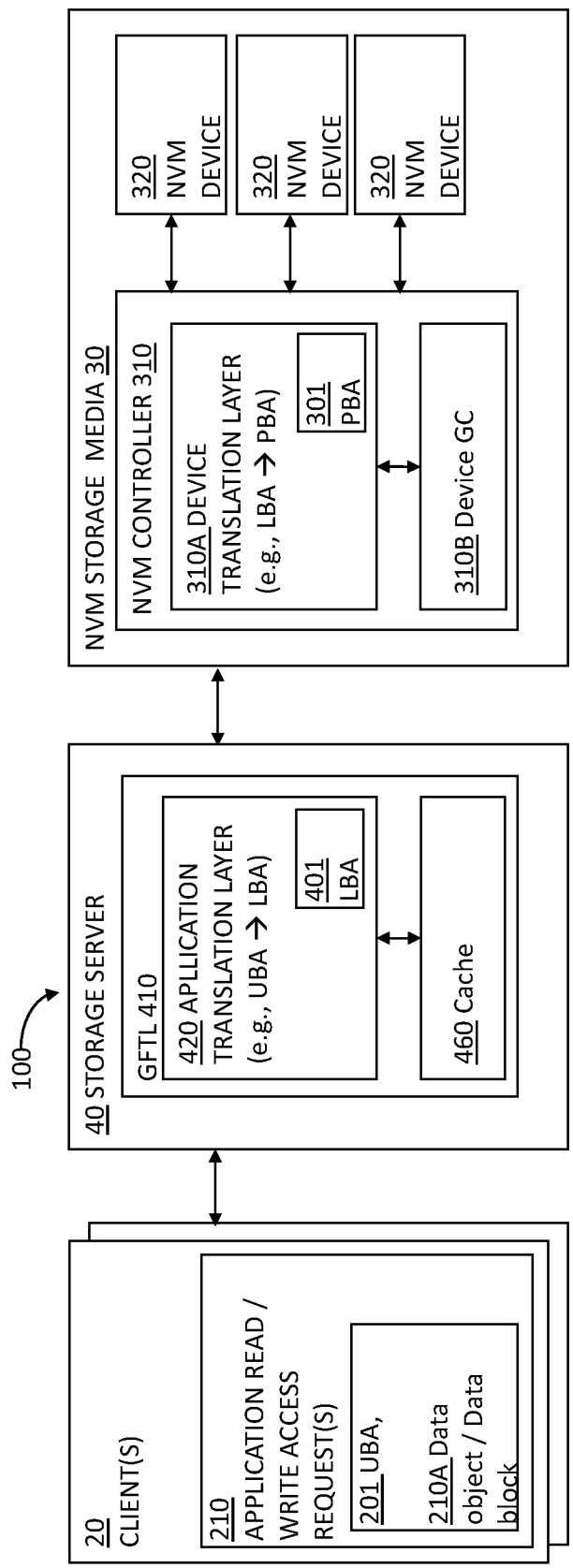
FIG. 2 is a block diagram, depicting a system for managing data storage on NVM storage media according to some embodiments.

Reference is now made to FIG. 2, which is a block diagram, depicting a system 100 for managing data storage on NVM storage media 30, according to some embodiments. According to some embodiments, storage server 40 may include a global flash translation layer (GFTL) 410 module that may be adapted to implement one or more methods of managing storage on NVM storage media 30, as elaborated herein.

According to some embodiments of the invention, system 100 may be implemented as a software module, a hardware module or any combination thereof. For example, system 100 may be or may include a computing device such as element 1 of FIG. 1, and may be adapted to execute one or more modules of executable code (e.g., element 5 of FIG. 1) to manage data storage on NVM storage media 30, as described herein.

As shown in FIG. 2, system 100 may be, or may include a storage server 40, adapted to communicate, e.g., via a communication network such as the Internet, with one or more client computing devices 20. Storage server 40 may also be adapted to communicate with an NVM storage media 30, to serve data access requests (e.g., write access requests, read access requests, etc.) of the one or more client computing devices 20, as known in the art. Additionally, storage server 40 may be adapted to implement one or more methods for optimally managing data storage on NVM media 30, as elaborated herein.

According to some embodiments, a client computing device 20 may transmit a data access request 210, such as a data write request, to store a data object 210A, to storage server 40. data access request 210 may include a user block address 201 (UBA) in a user address space. The UBA 201 may, for example include a base address such as an address of a file or namespace, and an offset address of a storage block within the user address space. As shown in FIG. 2, GFTL 410 of storage server 40 may include a first address translation layer 420, adapted to translate between UBA 201 and a logical block address (LBA) 401, in a logical address space 450.

The term namespace may be used herein to represent an identifier of a data element that may be stored on an NVM storage device by embodiments of the invention. For example, a namespace may represent, or identify a virtual drive, a volume, an application-specific data element, a file, a portion of a database, and the like.

Storage server 40 may transmit, or propagate data access request 210, using the LBA 401 address to an NVM controller 310 of NVM storage media 30.

NVM controller 310 may be communicatively connected, e.g., via a Peripheral Component Interconnect Express (PCIE) to one or more NVM storage devices 320, and may control the functionality of the one or more NVM storage devices 320, as known in the art. Additionally, NVM controller 310 may collaborate with GFTL 410 of storage server 40 to perform at least one method of managing data storage on NVM media 30, as elaborated herein.

According to some embodiments, NVM controller 310 may implement a second address translation layer, depicted in FIG. 2 as "device translation layer" 310A, to maintain the association of each data object's 210A LBA 401 address with a physical address or physical block address (PBA) 301 on the one or more NVM storage devices 320.

Additionally, NVM controller 310 may employ at least one internal or local garbage-collection module, which may also be referred to as a device GC module 310B. Device GC module 310B may be adapted to reclaim invalid storage pages on the one or more NVM storage devices 320, as elaborated herein.

Figure 3:
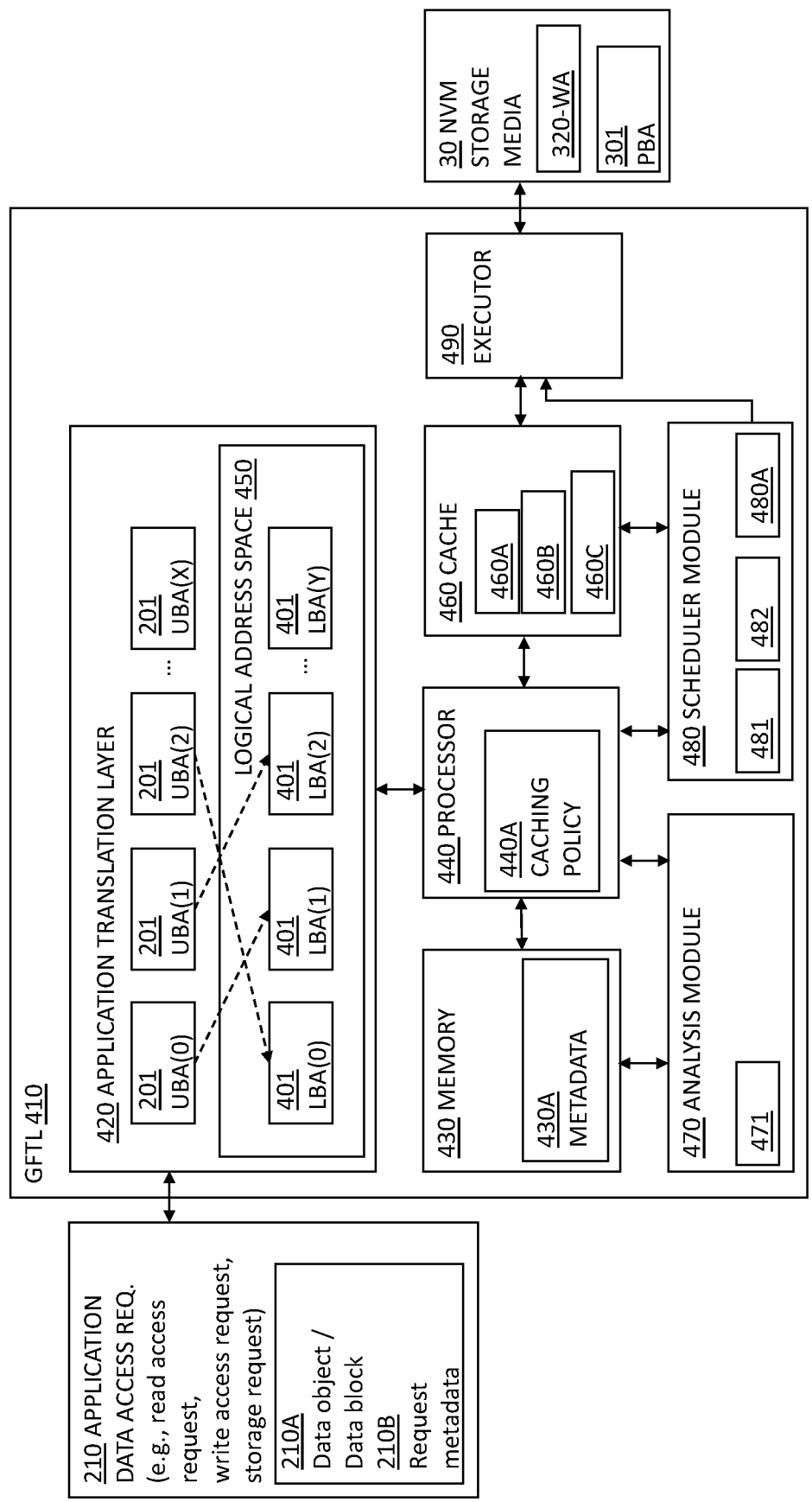
FIG. 3 is a block diagram, depicting a global flash translation layer, which may be included in a system for managing data storage on NVM storage media according to some embodiments.

Reference now made to FIG. 3, which is a block diagram, depicting GFTL module 410, which may be included in a system for managing data storage on NVM storage media according to some embodiments.

According to some embodiments, GFTL 410 may include, or may be associated with at least one processor 440, such as processor 2 of FIG. 1. Processor 440 may be adapted to collaborate with a persistent cache module or buffer 460, so as to implement a caching policy 440A that may (a) optimally buffer or cache data objects 210A pertaining to specific logical block addresses, and (b) invalidate these data objects 210A from persistent cache module 460, based on various conditions and/or parameters, as elaborated herein. The term "optimal" may be used in this context in a sense that the period of time for which a data object 210A may be kept in persistent cache memory module 460 before being copied to the underlying NVM storage device 320 may best fit these parameters, so as to minimize the effect of device GC 310B writes on write amplification. In addition, the term "optimal" may be used in this context in a sense of an optimal allocation of memory space on persistent cache memory 460, so as to best serve the storage of each data object 210A, included in each namespace or file on the underlying NVM storage devices 320 of NVM media 30.

According to some embodiments of the invention, GFTL 410 may receive a storage request 210, to store at least one data block of a data object 210A on NVM media 30. GFTL 410 may initially store the content of the at least one data block on cache memory module or device 460. The term "content" may refer in this sense to some, or all of the actual data that is included in data object 210A, to be stored in NVM media 30. Processor 440 may be adapted to implement caching policy 440A on the incoming one or more data blocks by scheduling transfer, or movement of the incoming data objects 210A to at least one NVM storage device 320, as elaborated herein.

According to some embodiments, processor 440 may schedule a future movement action of the content of the at least one data block from cache memory module 460 to the NVM media 30, and then enable or allow movement of content of the at least one data block of data object 210A from cache memory module 460 to at least one NVM device 320 of the NVM media, according to the scheduled movement action, as elaborated herein.

According to some embodiments of the invention, processor 440 may maintain (e.g., on a memory module 430, such as memory 4 of FIG. 1) metadata 430A that is namespace-specific, and relates to a predefined number of recently written blocks. The namespace-specific metadata 430A may include, for example, values of parameters or characteristics of write patterns of data access requests 210, such as a time period that has elapsed from a previous write of the same LBA 401.

According to some embodiments, as shown in FIG. 3, GFTL 410 may include an analysis module 470, and a scheduler module 480. Analysis module 470 may be adapted to analyze metadata 430A pertaining to specific namespaces or files. Processor 440 may subsequently collaborate with scheduler module 480, to schedule a movement action from the persistent cache memory 460 to the underlying NVM storage device 320 based on the analysis of analysis module 470, as elaborated herein.

For example, embodiments of the invention may be adapted to manage storage of data objects 210A pertaining to a first file or namespace, having a first LBA 401 address and data objects 210A pertaining to a second file or namespace, having a second LBA 401 address. Processor 440 may collaborate with scheduler module 480 to schedule movement actions of data blocks from the persistent cache memory to the underlying NVM storage device. In a condition that a rate of rewriting or updating of content of the first LBA 401 is higher than the rate of rewriting or updating of content of the second LBA 401, processor 440 may configure scheduler module 480 to schedule movement actions of the content of the first LBA 401, from the persistent cache memory 460 to the underlying NVM storage device 320 to be more frequent than the movement of content of the second LBA 401, from persistent cache memory 460 to the underlying NVM storage device 320.

According to some embodiments, scheduler module 480 may include, or maintain a scheduling data structure or table 480A, such as the example of Table 1, below:

TABLE 1

| Data object ID | Start address | End address | Schedule timestamp (e.g., storage and/or invalidation) | Namespace | Working set |
|---|---|---|---|---|---|
| ID 1 | LBA (1) | LBA (2) | ST 1 | NS 1 | WS 1 |
| ID 2 | LBA (3) | LBA (4) | ST 2 | NS 2 | WS 2 |
| ID 3 | LBA (5) | LBA (6) | ST 3 | NS 3 | WS 3 |

According to some embodiments, each entry (e.g., line) of table 480A may represent a scheduled movement action or transmission action of a data object 210A from cache 460 to an NVM storage device 320 of the underlying NVM storage media 30.

As shown in the example of table 1, each entry of table 480A (e.g., each scheduled movement action) may include, for example, an identification (e.g., ID 1, ID 2, ID 3) of a data object 210A; a logical address range (e.g., a start logical address block and an end logical address block, such as from LBA (1) to LBA(2)) of a specific data object 210A to be stored; a scheduled timestamp or timeout corresponding to the data object; a namespace (e.g., a volume, a file, etc. such as NS 1, NS 2, NS 3) which the relevant data object 210A may correspond to, or be included therein; and a working set (e.g., WS 1, WS 2, WS 3) which the relevant data object 210A may correspond to.

In the example of table 1, scheduled timestamp may indicate a calculated time for a future scheduled timestamp (e.g., ST 1, ST 2, ST 3) or timeout for movement of data object 210A from cache 460 to NVM device 320. Additionally, or alternatively, future scheduled timestamp (e.g., ST 1, ST 2, ST 3) or timeout may indicate a future time for deleting, purging or invalidating the storage of data object 210A on cache memory 460. Additional implementations may also be possible.

According to some embodiments, GFTL 410 may include an executor module 490, adapted to collaborate with scheduler module 480 so as to execute the storage, or movement, of data objects 210A from cache 460 to NVM storage media 30, according to the scheduled movement actions of scheduling data structure 480A. For example, when a time of a future scheduled timestamp (e.g., ST 1) has elapsed, scheduler module 480 may notify (e.g., via an interrupt mechanism) executor module 490 to move or transmit a specific, relevant data object 210A (e.g., ID1) from cache 460 to NVM media 30. Executor module 490 may, in turn, communicate with NVM controller 310 of NVM media 30, and transfer the relevant data object 210A to NVM media 30 to be stored there. It may be appreciated by a person skilled in the art that other implementations of scheduler module 480 and/or executor module 490 may also be possible.

According to some embodiments, the content, or data included in logical blocks (e.g., content of data object 210A) may only be written or moved to the physical NVM storage media 30 when the scheduled or calculated time expires. For example, processor 440 may disable a copy, transfer or movement of data objects 210A from cache 460 to an NVM device 320 on NVM storage media 30 by default, and allow or permit such movement only after the timestamp for storage has elapsed, e.g., via the executor module 490, as elaborated herein.

According to some embodiments, metadata 430A may include namespace-specific metadata, that may include a rate of appearance of data access requests (e.g., write access requests, erase requests, etc.) pertaining to LBAs 401 of specific namespaces or files.

Additionally, or alternatively, metadata 430A may include namespace-specific metadata, that may include a mean time-gap value between consecutive data access requests pertaining to LBAs 401 of the specific namespaces or files.

Additionally or alternatively, metadata 430A may include namespace-specific metadata, that may include an indication of seriality of data objects 210A in at least one incoming data access request 210.

According to some embodiments of the invention, processor 440 may collaborate with analysis module 470, to analyze metadata 430A (e.g., the rate of appearance), and calculate, based on the analysis, how much time should elapse before the content of a logical block in the cache should be invalidated.

Processor 440 may subsequently configure scheduler module 480 to schedule, e.g., on scheduler table 480A, an invalidation of data objects 210A on the persistent cache memory, and invalidate the content of the logical blocks only when the scheduled or calculated time expires.

According to some embodiments, analysis module 470 may calculate a mean value of time duration between consecutive appearances of write access requests pertaining to LBAs 401 of a specific namespace. This value may be referred to herein as an "expected recurrence " (denoted as element 471 of FIG. 3) of write requests, pertaining to the specific namespace.

Upon reception of a write access request for storing a data object 210A belonging to that namespace, processor 440 may associate or attribute a reception timestamp 481 to at least one data object or data block 210A of the newly received write access request. Reception timestamp 481 may be or may include, for example, an integer value representing a coordinated universal time (UTC) value, that corresponds to the time of reception of the write access request. Scheduler module 480 may subsequently calculate a scheduled timestamp or timeout value (denoted as element 482 of FIG. 3), based on reception timestamp 481 corresponding to the rate of appearance. For example, the scheduled timestamp or timeout value may represent a future UTC value that is a sum of: (a) the reception timestamp UTC value and (b) the expected recurrence 471 value.

Scheduler module 480 may schedule a future scheduled timestamp for a movement action of the relevant data object(s) 210A from the persistent cache memory 460 to a physical storage device 320 in the NVM storage media 30, based on the calculated timeout value. For example, a future scheduled timestamp (e.g., ST 1) on scheduler table 480A may be equal to the calculated timeout value, and processor 440 may enable server 40 to transfer or move the relevant data object 210A once scheduled timestamp ST 1 has elapsed.

Additionally, or alternatively, processor 440 may invalidate, on cache memory module 460, storage of at least one data block or data object 210A based on the calculated timeout value. For example, a future scheduled timestamp (e.g., ST 1) on scheduler table 480A may be equal to the calculated timeout value, and processor 440 may invalidate or delete data object 210A on cache memory module 460 when timestamp ST 1 has elapsed.

It may be appreciated that by delaying write operations based on the caching policy 440A, embodiments of the invention may prevent rewriting the same logical blocks, and thus decrease data fetching latency, decrease GC-related writes, decrease WA and increase the NVM device's 320 endurance.

For example, GFTL 410 of storage server 40 may receive a first storage request 210 that includes, or corresponds to at least one first LBA 401, associated with at least one first data block. Processor 440 may collaborate with scheduler module 480 to compare the at least one first LBA 401 with one or more second LBAs in logical address space 450 and/or scheduler table 480A, that are associated with or which specify one or more respective, previously received (e.g., previous to first storage request 210) second data objects or data blocks 210A. Processor 440 may collaborate with scheduler module 480 to prevent movement of the one or more second (e.g., older) data blocks to the NVM media based on the comparison. For example, if the two LBAs are equal, movement may be prevented.

An LBA 210 of a recently received data object 210A may be found equal to an LBA of a second, older data object 210A in scheduler table 480A. In such a condition, scheduler module 480 may replace the entry of the second, older data object 210A in scheduler table 480A with a new entry, pertaining to the new, first data object 210. Processor 440 may thus collaborate with scheduler module 480 to prevent movement of the older content of LBA 210 from cache memory 460 to NVM storage device 320, and schedule anew, future transfer of movement of the new data object 210A from cache memory 460 to NVM storage device 320.

Additionally, processor 440 may adapt (e.g., increase or decrease) the cache memory size (e.g., 460A, 460B, 460C) that is dedicated to one or more specific files or namespaces based on the calculated time. For example, processor 440 may continuously monitor metadata 430 of incoming application data requests 210, and may increase the cache memory space (e.g., 460A) dedicated to a specific namespace (e.g., NS 1) when the amount of data to be held at a given point in time increases, and decrease cache memory space (e.g., 460A) dedicated to that namespace (e.g., NS 1) when the amount of data to be held at a given point in time decreases.

According to some embodiments, metadata 430A may include values of parameters or characteristics of a working set pertaining to one or more namespaces or files. The term "working set" may be used herein to refer to a set of logical blocks of a specific namespace or file that are accessed in a given time period. For example, an application may maintain a first group of data objects 210A, corresponding to a first working set, and a second group of data objects 210A, corresponding to a second working set. It may be appreciated that the first working set and second working set may differ in size. In addition, the application may update or rewrite content of logical blocks of the first set at a first rate, and update or rewrite content of logical blocks of the second set at a second, different rate.

According to some embodiments of the invention, storage server 40 may receive a plurality of storage requests 210 (e.g., to store a data object or data block 210A), each including, or associated with respective storage request metadata 210B. Storage request metadata 210B (e.g. describing the data or items separate from the data) may include, for example, (a) a size of storage corresponding to the respective storage request 210, e.g., a size of data object or data block 210A included in storage request 210, (b) a timestamp, corresponding to a time of reception of storage request 210, and (c) a namespace (e.g., a file, a volume, a variable name, etc.) to which data object or data block 210A of storage request 210 pertains.

Processor 440 may collaborate with analysis module 470 to analyze storage request metadata 210B, so as to obtain parameters or characteristics of a working set pertaining to at least one namespace. For example, analysis module 470 may evaluate or calculate a size of the working set and/or a rate of access (e.g., rewriting) of the working set. In this example, metadata 430A may include, for example, a size of a working set, a time of accessing an LBA 401 included in the working set, a rate of accessing the working set, and the like.

Based on the calculated size of the working set and/or the calculated rate of access, processor 440 may be adapted to estimate the optimal cache memory space (e.g., 460A, 460B, 460C) that may be dedicated to one or more specific working sets. Processor 440 may provision, or allocate on the cache memory module, a memory space that is dedicated for the at least one namespace, based on the obtained working set size and/or rate of access.

For example, processor 440 may provision or allocate a large cache memory space (e.g., 460C), dedicated to a large working set, and a small or smaller cache memory space (e.g., 460A), dedicated to a small working set.

Additionally, or alternatively, processor 440 may dedicate or allocate a large cache memory space (e.g., 460C) to a working set that is frequently accessed, updated or rewritten, and a small or smaller cache memory space (e.g., 460A) to a working set that is infrequently accessed, updated or rewritten. Embodiments of the invention may thus avoid rewriting of content of LBAs 401 onto the underlying NVM memory device 320, and reduce the underlying storage device write amplification.

Processor 440 may store content of incoming data blocks or objects 210A on cache memory module 460 according to the dedicated memory space of the at least one namespace. In other words, processor 440 may utilize metadata 210B of incoming data access requests 210 to identify the namespace of data objects 210A included therein, and store one or more (e.g., each) incoming data object in the respective cache memory space (e.g., 460A, 460B) dedicated to the respective namespace.

Additionally, or alternatively, processor 440 may store content of incoming data blocks or objects 210A on cache memory module 460 according to the dedicated memory space of at least one working set. In other words, processor 440 may utilize metadata 430A to identify the working set of data objects 210A included therein, and store one or more (e.g., each) incoming data object 210A in the respective cache memory space (e.g., 460A, 460B) dedicated to the respective working set.

According to some embodiments, analysis module 470 may calculate a mean value of time duration between consecutive appearances of write access requests pertaining to LBAs 401 of a specific working set. This value may be referred to herein as an "expected recurrence" (denoted as element 471 of FIG. 3) of write requests, pertaining to the specific working set. Upon reception of a write access request for storing a data object 210A belonging to that working set, processor 440 may associate or attribute a reception timestamp 481 to at least one data object 210A of the newly received write access request.

Scheduler module 480 may subsequently calculate a scheduled timestamp or timeout value (denoted as element 482), corresponding to the rate of appearance. For example, the scheduled timestamp or timeout value may represent a future UTC value that is a sum of: (a) the reception timestamp UTC value and (b) the expected recurrence 471 value.

As shown in the example of Table 1, scheduler module 480 may schedule, e.g., on scheduler table 480A, a future scheduled movement of a data object 210A (e.g., ID 1) associated with a specific working set (e.g., WS 1) from the persistent cache memory 460 to a physical storage device 320 in the NVM storage media 30. Additionally, or alternatively, scheduler module 480 may schedule, e.g., on scheduler table 480A, a future purge or invalidation of a data object 210A (e.g., D2) associated with a specific working set (e.g., WS 2) from the persistent cache memory 460.

According to some embodiments of the invention, embodiments of the invention may analyze parameters or characteristics that pertain to a type of the underlying storage media and storage devices 320 being used, and may implement a caching policy 440A that corresponds to, or best fits these parameters or characteristics.

For example, NVM storage media 30 may include a first, high capacity, low endurance NVM device 320 and a second, low capacity, high endurance NVM device 320. Embodiments of the invention may allocate cache memory space (e.g., 460A, 460B, 460C) based on these endurance and capacity parameters. For example, processor 440 may allocate a first cache memory space 460C, dedicated to a first working set that is physically stored on the first NVM storage device 320, and allocate a second cache memory space 460A, dedicated to a second working set that is physically stored on the second NVM storage device 320. Assuming that characteristics (e.g., access rate, size, etc.) of the first working set and second working set are substantially equivalent, embodiments of the invention may allocate the first cache memory space 460C such that it may be larger than the second cache memory space 460A, due to the difference in endurance between the first NVM storage device 320 and the second NVM storage device 320.

According to some embodiments of the invention, processor 440 may query a controller 310 of one or more NVM storage devices 320, to obtain at least one parameter pertaining to a status of the one or more NVM storage devices. Embodiments of the invention may analyze the obtained status parameters and change the rate at which the content of LBAs 401 are written to the underlying storage devices 320, based on the analysis.

For example, processor 440 may query NVM controller 310 to obtain a current value of write amplification 320-WA. Processor 440 may subsequently compare the obtained WA value 320-WA to a predetermined threshold, and collaborate with scheduler module 480 (e.g., by adapting or modifying scheduler table 420A) to change a rate at which LBAs 401 are written to the underlying storage devices 320: in case the WA value 320-WA is low (e.g., beneath the predetermined threshold, or nearing the ideal value of 1.0), processor 440 may configure scheduler 480 to submit more write actions to the NVM storage device 320, and invalidate content of LBAs 401 from cache 460 more frequently, without risking a detrimental impact on the endurance and performance of the NVM storage device 320. In a complementary manner, in case the WA value 320-WA is high (e.g., beyond a predetermined threshold), processor 440 may configure scheduler 480 modify scheduler table 480A so as to submit less write actions to the NVM storage device 320, and invalidate content of LBAs 401 from cache 460 less frequently.

According to some embodiments, an NVM controller 310 of NVM storage media 30 may include a backend device garbage collection module 310B, adapted to perform GC on the physical data blocks stored on one or more NVM storage devices 320 of NVM storage media 30. According to some embodiments of the invention, processor 440 may collaborate or communicate with NVM storage controller 310, so as to notify controller 310 of LBAs 401 that are stored or included in the persistent cache module 460. Consequently, processor 440 may cause NVM storage controller 310 device GC 310B, during a back-end GC process, to skip blocks that currently exist in the persistent caching module 460.

In other words, processor 440 may prevent NVM manager 310 from garbage-collecting data blocks that have a specific LBA 401, when corresponding blocks (e.g., corresponding to the same LBA 401 address) exist in the persistent cache memory 460. It may be appreciated that by skipping such blocks, a garbage collection process may avoid writing them to another physical block on one or more NVM devices 320. Thus, embodiments of the invention may decrease the overall number of PE cycles, improve the write amplification factor, and improve the endurance and performance of the underlying non-volatile storage device 320. In other words, a storage request 210 may include an LBA that is associated with a first data object or block 210A. Processor 440 may communicate with NVM controller 310, to prevent NVM controller 310 from performing garbage collection of data objects or blocks 210A that are: (a) stored on the at least one NVM device 320; and (b) are associated with the same logical block address.

Figure 4:
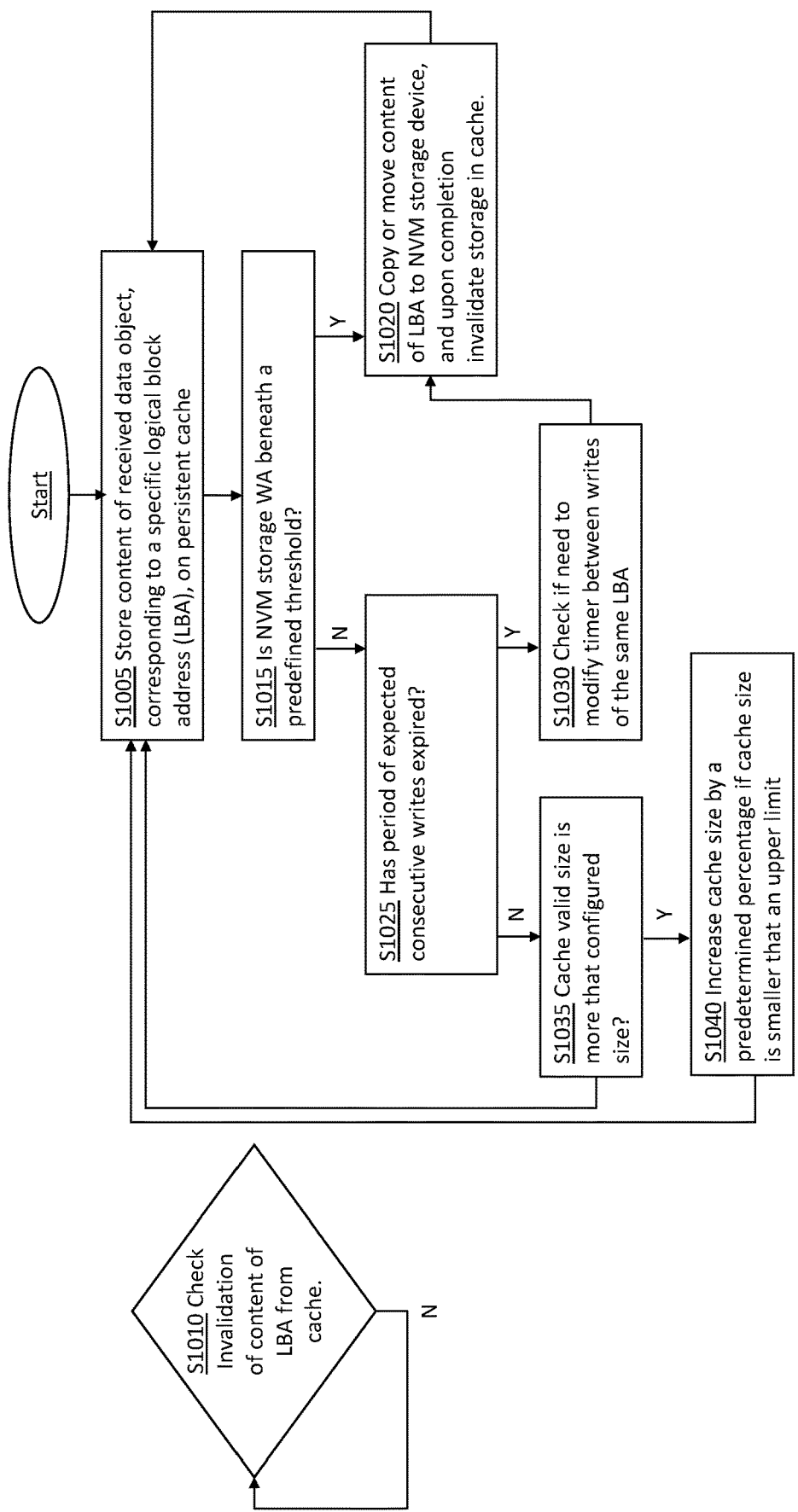
FIG. 4 is a flow diagram, depicting a method of managing data storage on NVM storage media, according to some embodiments.

Reference is now made to FIG. 4 which is a flow diagram, depicting a method of managing data storage on NVM storage media, by at least one processor (e.g., processor 440 of FIG. 3) according to some embodiments.

As shown in step S1005, processor 440 may store content of at least one received data object (e.g., data object 210A of FIG. 3), corresponding to a specific logical block address (LBA), on a persistent cache memory device (e.g., cache 460 of FIG. 3).

As elaborated herein (e.g., in relation to FIG. 3), processor 440 may collaborate with a scheduler module 480 to maintain a scheduling data structure or table 480A such as the example table 1. Scheduling data structure 480A may include a scheduled timestamp or timeout value (e.g., ST 1, ST 2, ST 3) that may indicate a future time for invalidation of a data object (e.g., data object ID 1) from cache memory 460. As shown in step S1010, processor 440 may continuously monitor scheduling data structure or table 480A (e.g., via a polling mechanism, an interrupt mechanism, etc.), to determine whether content of data object 210A should be deleted from, or invalidated in cache memory 460, based on the scheduled timestamp or timeout value (e.g., ST 1). Subsequently, processor 440 may perform such deletion when the scheduled timestamp or timeout value has elapsed.

As shown in step S1015, processor 440 may communicate with at least one NVM controller (e.g., NVM controller 310 of FIG. 2), and may query or obtain therefrom a value of WA (e.g., element 320-WA of FIG. 3) of at least one NVM storage device 320 on NVM media 30. Processor 440 may compare the obtained value of the WA 320-WA parameter to a predefined threshold.

According to some embodiments, processor 440 may collaborate with scheduler module 480 to schedule (e.g., on scheduler data structure 480A) a time for the movement action based on the comparison of the write amplification parameter and the predefined threshold.

For example, and as shown in step S1020, if obtained WA value 320-WA is beneath the threshold, then processor 440 may enable the content data object 210A (e.g., the content of LBAs corresponding to data object 210A) to be moved or copied from cache memory 460 to NVM storage device 320.

Additionally, or alternatively, processor 440 may invalidate or delete the storage of data object 210A in cache 460 upon completion of the data movement.

As elaborated herein (e.g., in relation to FIG. 3), scheduling data structure or table 480A may include a scheduled timestamp or timeout value (e.g., ST 1, ST 2, ST 3) that may indicate a future time for movement of a data object (e.g., data object ID 1) from cache memory 460 to NVM device 320. As shown in step S1025, processor 440 may determine whether a time of a scheduled timestamp has elapsed. For example, the timestamp for future data movement may be set according to an expected recurrence 471 value, as elaborated herein. In this example, processor 440 may determine whether a period (e.g., a mean period) between two expected consecutive writes of the same LBA has expired.

As shown in step S1030, if the timestamp for future data movement (e.g., a mean period between two consecutive writes has expired), processor 440 may check whether the expected recurrence 471 value (e.g., the mean time between consecutive writes to the same LBA) should be recalculated. Processor 440 may then continue to enable the content data object 210A to be moved or copied from cache memory 460 to NVM storage device 320, in step S1020.

As elaborated herein (e.g., in FIG. 3), processor 440 may be adapted to maintain one or more cache areas or regions (e.g., areas 460A, 460B, 460C of FIG. 3) that may be specifically dedicated to one or more respective namespaces and/or working sets. As shown in steps S1035 and S1040, if a memory region that is required by a specific working set and/or namespace exceeds (e.g., due to incoming data objects 210A) a cache area that is allocated for that specific working set and/or namespace, then processor 440 may increase the cache size of the relevant region by a predetermined number or percentage. In a similar, complementary manner, if a memory region that is required by a specific working set and/or namespace is beneath a predefined threshold (e.g., due to lack of incoming data objects 210A), then processor 440 may decrease the cache size of the relevant region by a predetermined percentage or number. According to some embodiments, processor 440 may limit the size of the dedicate cache regions (e.g., areas 460A, 460B, 460C) by a predefined upper limit.

Figure 5:
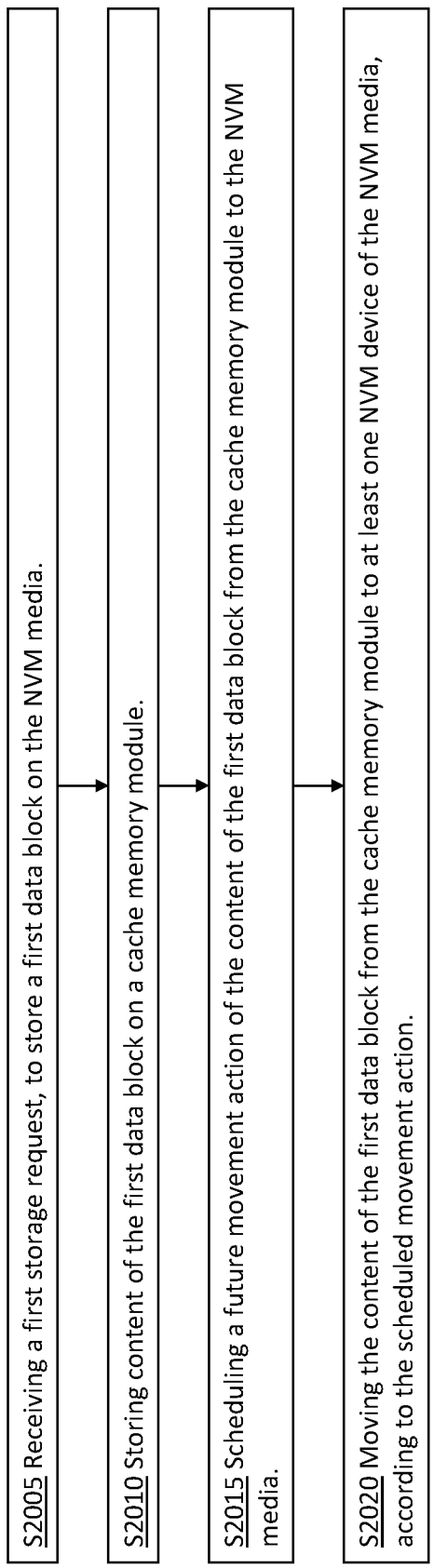
FIG. 5 is a flow diagram, depicting a method of managing data storage on NVM storage media according to some embodiments.

Reference is now made to FIG. 5 which is a flow diagram, depicting a method of managing data storage on NVM storage media, by at least one processor, according to some embodiments.

As shown in step S2005, the at least one processor (e.g., processor 440 of FIG. 3) may receive a first data access request (e.g., element 210 of FIG. 3), such as a storage request, to store a first data object or data block (e.g., element 210A of FIG. 3) on the NVM storage media 30.

As shown in step S2010, the at least one processor 440 may store content of the first data block 210A (e.g., actual data included in data block 210A) on a buffer memory or cache memory module (e.g., cache 460 of FIG. 3).

As shown in step S2015, the at least one processor 440 may include, or may collaborate with a scheduling module (e.g., scheduler module 480 of FIG. 3), to schedule a future movement action of the content of the first data 210A block from cache memory module 460 to NVM media 30 (e.g., to at least one NVM device 320 in NVM media 30).

As shown in step S2020, the at least one processor 440 may move the content of the first data block from cache memory module 460 to the at least one NVM device 320 of the NVM media 30, according to (e.g., at the time of) the scheduled movement action.

Figure 6:
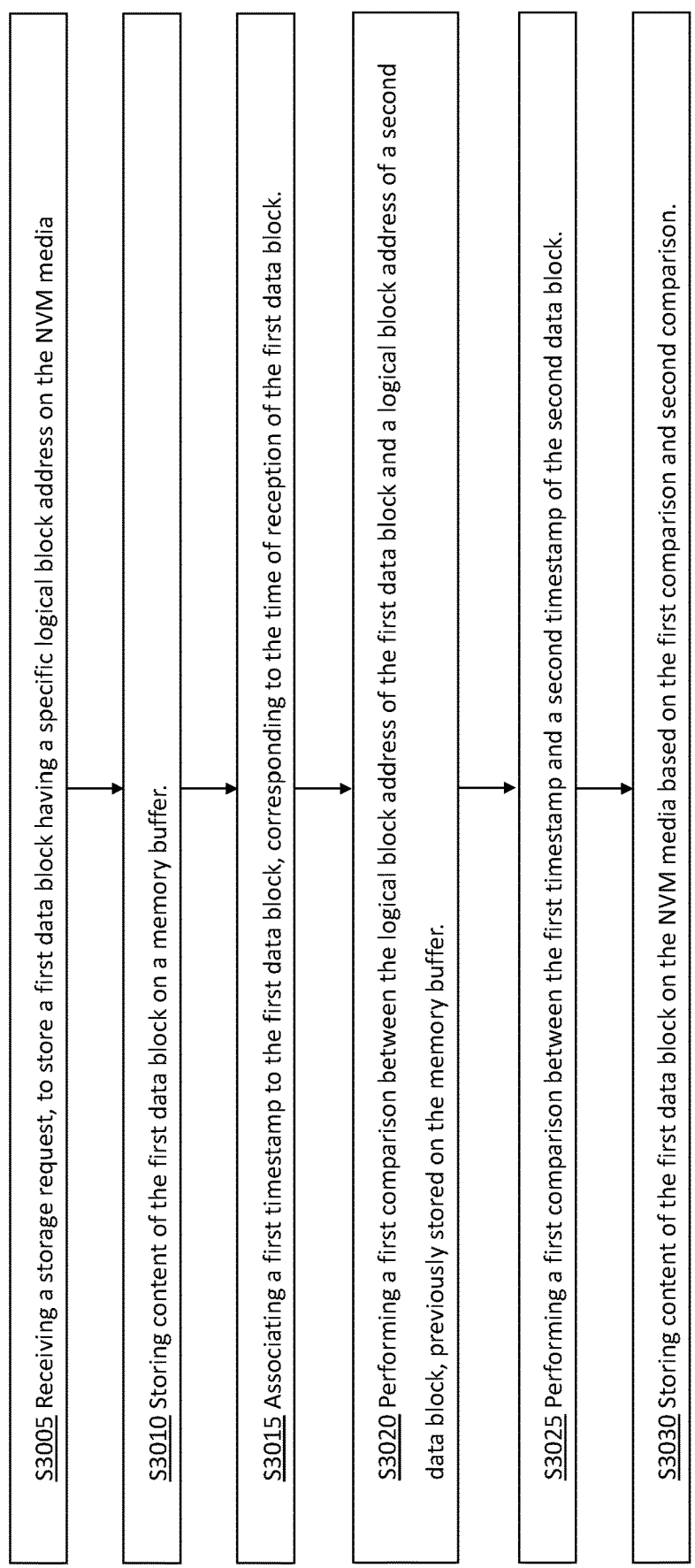
FIG. 6 is a flow diagram, depicting a method of managing data storage on NVM storage media according to some embodiments.

Reference is now made to FIG. 6 which is a flow diagram, depicting a method of managing data storage on NVM storage media, by at least one processor, according to some embodiments.

As shown in step S3005, the at least one processor (e.g., processor 440 of FIG. 3) may receive a storage request (e.g., element 210 of FIG. 3), to store a first data block (e.g., element 210A of FIG. 3) having a specific logical block address on the NVM media.

As shown in step S3010, the at least one processor 440 may store content of the first data block 210A (e.g., data included in first data block 210A) on a memory buffer such as cache module 460 of FIG. 3.

As shown in step S3015, the at least one processor 440 may associate a first timestamp to the first data block 210A, corresponding to the time (e.g., time as represented by a UTC value) of reception of the first data block 210A.

As shown in step S3020, the at least one processor 440 may perform a first comparison between the logical block address of the first data block and a logical block address of a second data block 210A, previously (e.g., before reception of first data block 210A) stored on the memory buffer 460. Second data block 210A may be associated with a second timestamp corresponding to the time of reception of the second data block 210A.

As shown in step S3025, the at least one processor 440 may perform a first comparison between the first timestamp (e.g., of the second data block) and a second timestamp (e.g., of the second data block).

As shown in step S3030, the at least one processor 440 may move or store the content of the first data block 210A on the NVM media 30 based on the first comparison and second comparison.

For example, if the first comparison yields that the first data block and second data block correspond to the same logical block address, processor 440 may calculate a difference between the first timestamp and the second timestamp: If the calculated difference exceeds a predetermined threshold, then processor 440 may move or store the content of the first data block 210A on NVM media, substantially immediately. If, on the other hand, the calculated difference does not exceed the predetermined threshold, then processor 440 may schedule a future storage action, and move or store the content of the first data block 210A on NVM media according to (at the future time of) the scheduled storage action.

Embodiments of the invention include a practical application for management of storage on non-volatile storage devices, as elaborated herein. Embodiments of the invention include an improvement in technology over currently available storage systems by dynamically managing scheduled (e.g., future) storage of incoming data objects or data blocks. By doing so, embodiments of the invention may decrease the amount of unnecessary write operations, both from the user side and from back-end garbage collection mechanisms, as elaborated herein. It may be appreciated by a person skilled in the art that such decrease of writing actions is beneficial both for improving storage performance (e.g., average and tail latency) and storage reliability and endurance.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of managing data storage, on non-volatile memory (NVM) media, by at least one processor, the method comprising:
   receiving a first storage request, to store a first data block on the NVM media;
   storing content of the first data block on a cache memory module;
   scheduling a future movement action of the content of the first data block from the cache memory module to the NVM media by
      querying a value of a write amplification parameter from a controller of at least one NVM device of the NVM media;
      comparing the value of the write amplification parameter to a predefined threshold; and
      scheduling a time for the future movement action based on the comparison of the value of the write amplification parameter and the predefined threshold; and
   moving the content of the first data block from the cache memory module to the at least one NVM device of the NVM media, according to the scheduled future movement action.

2. The method of claim 1, wherein the first storage request comprises a first logical block address associated with the first data block, and wherein scheduling the future movement action comprises:
   comparing the first logical block address with one or more second logical block addresses, associated with one or more respective, previously received second data blocks; and
   preventing movement of the one or more second data blocks to the NVM media based on the comparison.

3. The method of claim 1, further comprising attributing a timestamp to the first data block, said timestamp corresponding to a time of reception of the first storage request, and wherein scheduling the future movement action further comprises:
   calculating a timeout value based on the timestamp; and
   scheduling the time for the future movement action based further on the calculated timeout value.

4. The method of claim 3, further comprising invalidating, on the cache memory module, storage of at least one data block based on the calculated timeout value.

5. The method of claim 1, wherein the first storage request comprises a logical block address associated with the first data block, and wherein the method further comprises preventing the controller of the at least one NVM device from performing garbage collection of data blocks that are: (a) stored on the at least one NVM device; and (b) are associated with the logical block address.

6. The method of claim 1, further comprising:
   receiving a plurality of storage requests, each associated with respective storage request metadata;
   analyzing the storage request metadata of the plurality of storage requests to obtain a size of a working set of at least one namespace; and provisioning, on the cache memory module, a memory space that is dedicated for the at least one namespace, based on the obtained size of the working set, wherein the storage request metadata associated with a respective storage request of the plurality of storage requests is selected from a list consisting of: a namespace corresponding to the respective storage request, a timestamp corresponding to a reception of the respective storage request, and a size of storage corresponding to the respective storage request.

7. The method of claim 6, wherein analyzing the storage request metadata of the plurality of storage requests further comprises obtaining a rate of access of the working set, and wherein provisioning the dedicated memory space on the cache memory module is further based on the rate of access of the working set.

8. The method of claim 6, wherein storing the content of the first data block on the cache memory module is done according to the dedicated memory space of the at least one namespace.

9. A system for managing data storage, on non-volatile memory (NVM) media, the system comprising: a non-transitory memory device wherein modules of instruction code are stored, and at least one processor associated with the memory device, and configured to execute the modules of instruction code, whereupon execution of said modules of instruction code, the at least one processor is configured to:

receive a first storage request, to store a first data block on the NVM media;

store content of the first data block on a cache memory module;

schedule a future movement action of the content of the first data block from the cache memory module to the NVM media by:

querying a value of a write amplification parameter from a controller of at least one NVM device of the NVM media;

comparing the value of the write amplification parameter to a predefined threshold; and scheduling a time for the future movement action based on the comparison of the value of the write amplification parameter and the predefined threshold; and move the content of the first data block from the cache memory module to the at least one NVM device of the NVM media, according to the scheduled future movement action.

10. The system of claim 9, wherein the first storage request comprises a first logical block address associated with the first data block, and wherein the at least one processor is further configured to schedule the future movement action by:

comparing the first logical block address with one or more second logical block addresses, associated with one or more respective, previously received second data blocks; and preventing movement of the one or more second data blocks to the NVM media based on the comparison.

11. The system of claim 9, wherein the at least one processor is configured to attribute a timestamp to the first data block, said timestamp corresponding to a time of reception of the first storage request, and wherein the at least one processor is further configured to schedule the future movement action by:

calculating a timeout value based on the timestamp; and scheduling the time for the future movement action based on the calculated timeout value.

12. The system of claim 11, wherein the at least one processor is configured to invalidate, on the cache memory module, storage of at least one data block based on the calculated timeout value.

13. The system of claim 9, wherein the first storage request comprises a logical block address associated with the first data block, and wherein the at least one processor is configured to prevent the controller of the at least one NVM device from performing garbage collection of data blocks that are: (a) stored on the at least one NVM device; and (b) are associated with the logical block address.

14. The system of claim 9, wherein the at least one processor is further configured to:

receive a plurality of storage requests, each associated with respective storage request metadata;

analyze the storage request metadata of the plurality of storage requests to obtain a size of a working set of at least one namespace; and provision, on the cache memory module, a memory space that is dedicated for the at least one namespace, based on the obtained size of the working set.

15. The system of claim 14, wherein the storage request metadata associated with a respective storage request of the plurality of storage requests is selected from a list consisting of: a namespace corresponding to the respective storage request, a timestamp corresponding to a reception of the respective storage request, and a size of storage corresponding to the respective storage request.

16. The system of claim 14, wherein analyzing the storage request metadata of the plurality of storage requests further comprises obtaining a rate of access of the working set, and wherein provisioning the dedicated memory space on the cache memory module is further based on the rate of access of the working set.

17. The system of claim 14, wherein storing the content of the first data block on the cache memory module is done according to the dedicated memory space of the at least one namespace.

* * * * *